(12) United States Patent
Yamamoto et al.

(10) Patent No.: US 8,622,091 B2
(45) Date of Patent: Jan. 7, 2014

(54) PROTECTOR FOR TUBULAR THREADED JOINT

(75) Inventors: Yasuhiro Yamamoto, Wakayama (JP); Shigeo Nagasaku, Hyogo (JP); David W. Clem, Spring, TX (US)

(73) Assignees: Nippon Steel & Sumitomo Metal Corporation, Tokyo (JP); Drilltec Patents & Technologies Company, Inc., Houston, TX (US)

( * ) Notice: Subject to any disclaimer, the term of this patent is extended or adjusted under 35 U.S.C. 154(b) by 1218 days.

(21) Appl. No.: 12/222,694

(22) Filed: Aug. 14, 2008

(65) Prior Publication Data

US 2010/0038904 A1 Feb. 18, 2010

(51) Int. Cl.
  *B65D 59/00* (2006.01)
  *B65D 59/06* (2006.01)
  *F16L 9/14* (2006.01)
  *F16L 11/12* (2006.01)

(52) U.S. Cl.
  USPC ............. 138/96 T; 138/89; 138/145; 285/45

(58) Field of Classification Search
  USPC ............ 138/96 T, 89, 96 R, 145; 166/902; 285/45–55
  See application file for complete search history.

(56) References Cited

U.S. PATENT DOCUMENTS

| 2,930,409 | A | * | 3/1960 | Higgins | 138/96 T |
| 3,100,656 | A | * | 8/1963 | MacArthur | 285/55 |
| RE30,647 | E | * | 6/1981 | Blose | 285/332.2 |
| 4,809,752 | A | * | 3/1989 | Strodter | 138/96 T |
| 6,746,057 | B2 | * | 6/2004 | Goto et al. | 285/333 |
| 2003/0111838 | A1 | * | 6/2003 | Goto et al. | 285/94 |
| 2005/0242587 | A1 | | 11/2005 | Imai | |
| 2006/0197343 | A1 | * | 9/2006 | Imai et al. | 285/333 |

FOREIGN PATENT DOCUMENTS

| JP | 61-252822 | 11/1986 |
| JP | 9-72467 | 3/1997 |
| JP | 10-89567 | 4/1998 |
| JP | 2001-65752 | 3/2001 |
| JP | 2001-199469 | 7/2001 |
| JP | 2003-240188 | 8/2003 |
| JP | 2005-315307 | 11/2005 |
| WO | 00/28254 | 5/2000 |
| WO | 2005/024282 | 3/2005 |
| WO | 2006/075774 | 7/2006 |
| WO | 2006/104251 | 10/2006 |
| WO | 2007/042231 | 4/2007 |

* cited by examiner

*Primary Examiner* — Justin Jonaitis
(74) *Attorney, Agent, or Firm* — Clark & Brody

(57) ABSTRACT

A protector which prevents damage to a solid lubricating coating on a threaded portion of a threaded joint when the protector is mounted on a pin or a box of a threaded joint for pipes in which at least one of the pin or the box is lubricated with a solid lubricating coating comprises a tubular member having a threaded portion on its inner or outer peripheral surface which threadingly engages with at least a portion and preferably 3-5 complete threads of the threaded portion provided on the pin or the box to be protected. The thread height H1 of the threaded portion of the protector and the thread height H2 of the complete thread of the pin or the box on which the protector is mounted satisfy H1>H2, and the difference between H1 and H2 [=H1−H2] is larger than the maximum coating thickness at the thread crest of the solid lubricating coating which covers the threaded portion of the pin or the box.

14 Claims, 3 Drawing Sheets

PROTECTOR FOR TUBULAR THREADED JOINT

FIELD OF THE INVENTION

This invention relates to a protector for protecting a threaded joint for pipes and particularly for protecting a threaded joint for pipes which are used to connect oil country tubular goods (OCTG) until the joint is used. A protector according to the present invention is used to protect a threaded joint for pipes which is previously lubricated by a solid lubricating coating such that it does not require on-site application of a viscous liquid lubricant to the threaded joint prior to use in make-up of oil country tubular goods.

PRIOR ART

Oil country tubular goods such as tubing and casing used in the excavation of crude oil or gas oil are connected by threaded joints for pipes. A typical threaded joint for pipes used for connecting oil country tubular goods has a pin-box structure. A pin is a joint component having a male (external) thread, and a box is a joint component having a female (internal) thread. Typically, a pin is formed on the end of a steel pipe used as an oil country tubular good, and a box is formed on the inner peripheral surface of a coupling, which is a separate member. In a premium threaded joint which has an excellent fluid tight seal, an unthreaded metal contact portion is formed at the end of the male thread of the pin and at the base of the female thread of the box. An excellent fluid tight seal is obtained by inserting one end of an oil country tubular good into the coupling, threadably engaging the male thread and the female thread, and contacting the unthreaded metal contact portions with each other to form a metal-to-metal seal.

FIG. 1 schematically illustrates the assembled structure of a typical threaded joint and shows a steel pipe for an oil country tubular good and a threaded joint member (coupling) at the time of shipment. A pin 1 having a male threaded portion 3a is formed on the outer peripheral surface of both ends of a steel pipe A, and a box 2 having a female threaded portion 3b on its inner peripheral surface is formed on both sides of a coupling B. The coupling B is previously connected to one end of the steel pipe A. In this manner, a coupling-type threaded joint for pipes is normally shipped with a coupling connected to a steel pipe.

Although not shown in the drawing, prior to shipment, a protector is mounted on the pin of the steel pipe A and the box of the coupling B on the sides which are not being used for connection of the pipe and the coupling in order to protect the threaded joint (pin or box) against rusting, injuries, infiltration of foreign matter, and the like. These protectors are removed prior to use.

A protector is typically constituted by a short tubular member which is closed at one end and open at the other end. It is normally made of a resin or a metal-reinforced resin and is mounted on a threaded joint with its open end facing forward. However, there are also protectors which are open at both ends. A protector for a pin has a female thread on its inner peripheral surface for threadably engaging with the male thread of a pin, and a protector for a box has a male thread on its outer peripheral surface for threadably engaging with the female thread of a box. A protector is secured to a threaded joint by threading engagement. At this time, it is necessary to adequately perform tightening until there is interference between the threaded portions of a protector and a threaded joint so that the protector will not fall off even if it receives an impact during transport or handling after delivery. A protector, including its threaded portion, is normally formed by injection molding, and accordingly the threaded portion thereof is formed from a resin.

At the time of make-up of oil country tubular goods, a viscous liquid lubricant containing heavy metal powder and referred to as "compound grease" or "dope" has been applied in the field (on-site) to the contact surfaces of a threaded joint (the threaded portions and the unthreaded metal contact portions of the pin and the box) in order to increase the resistance to galling and fluid tightness of the joint. Such a compound grease is prescribed in BUL 5A2 of API standards. Compound grease also has a corrosion-protecting effect by preventing the contact surfaces to which it is applied from rusting.

Compound grease or other grease-type lubricant (for example, a lubricant referred to as "green dope" which does not contain heavy metal powder) has been used when mounting a protector on a pin or a box of a threaded joint. Gaps between a threaded joint and a protector can be filled by a grease-type lubricant. As a result, even if a protector is not provided with a sealing mechanism, the contact surfaces of a threaded joint are blocked from the exterior, and the applied lubricant exhibits the functions of preventing rust and preventing infiltration of foreign material.

However, in recent years, environmental regulations have been becoming stricter on a global scale, and there has been a demand for a threaded joint for pipes which can be made up without using a compound grease, which contains a large amount of heavy metal powder which can have an adverse effect on humans or living things, and which does not require any on-site lubricating treatment so as to increase the efficiency of the operating environment.

A representative example of such a threaded joint for pipes is one as proposed in below-identified Patent Document 1 in which the contact surfaces of a pin and/or a box are coated with a solid lubricating coating comprising a lubricating powder (such as molybdenum disulfide or graphite) dispersed in a resin.

Patent Document 2 identified below discloses a threaded joint for pipes in which the contact surface of at least one of a pin and a box is coated with a two-layer coating consisting of a viscous liquid or semisolid lubricating coating and atop it a dry solid coating. The dry solid coating is formed from a thermosetting resin such as an acrylic resin or an ultraviolet light curable resin.

Patent Document 3 identified below discloses a threaded joint for pipes in which a thin non-sticky lubricating coating comprising a lubricating powder dispersed in a solid matrix exhibiting plastic or viscous tribological behavior (flow behavior) is formed on the thread surfaces of a pin and a box. The matrix preferably has a melting point in the range of 80-320° C. and is formed by spray coating in a molten state (hot melt spraying), flame coating using a powder, or spray coating using an aqueous emulsion.

Patent Document 4 identified below discloses a threaded joint for pipes in which the contact surface of at least one of a pin and a box is coated with a two-layer coating consisting of a solid lubricating coating containing a lubricating powder and a binder and atop it a solid corrosion protective coating not containing solid particles.

A protector which is to be mounted on a threaded joint for pipes which has a lubricating coating and particularly a solid lubricating coating formed thereon and which is made up without application of compound grease is preferably mounted on a pin or a box also without application of a grease-type lubricant. In this case, as a seal is not obtained by a grease-type lubricant, it is necessary to impart sealing properties to the protector. There have been some proposals in this regard in the prior art.

For example, Patent Document 5 identified below discloses a protector for a threaded joint for pipes in which a sealing portion formed from an annular projecting elastic body is provided in the vicinity of at least one end of the surface of the protector opposing a pin or a box to impart sealing properties.

Patent Document 6 identified below proposes a protector for a pin which is is provided with a sealing member which covers the open end of the protector body and which projects into the open end. Paragraph 0021 of that patent document states that in order to minimize the action on a coating provided on the threaded portions of the threaded joint, the protector is designed such that it engages only with a portion of the thread in the threaded portion of the pin which is remote from the front end of the pin.

In Patent Document 7 identified below, it is described that the thread height of a protector for a box is made larger than that of the thread of the box, and that the thread height of a protector for a pin is made smaller than that of the thread of the pin.

Patent Document 1: JP H09-72467 A
Patent Document 2: WO 2006/104251
Patent Document 3: WO 2007/042231
Patent Document 4: WO 2006/75774
Patent Document 5: JP 2003-240188 A
Patent Document 6: WO 2005/024282
Patent Document 7: US 2005/0242587

SUMMARY OF THE INVENTION

With respect to a threaded joint for pipes in which the contact surfaces of the pin and/or the box are covered with a solid lubricating coating and which is designed such that it is made up (connected) without using a grease-type lubricant, if a protector is mounted without application of a grease-type lubricant and then the protector is removed and the contact surfaces of the threaded joint for pipes are inspected, it was found that the following phenomenon frequently occurs. Namely, the solid lubricating coating on the threaded portion of the threaded joint peels off the thread which engaged with the thread of the protector and the base metal is exposed. This peeling of the solid lubricating coating is particularly marked at the thread crest in a threaded portion of a threaded joint, while the solid lubricating coating is nearly unaffected (sound) at the thread root.

If a solid lubricating coating with which a threaded portion of a threaded joint for pipes is coated is partially peeled off due to mounting of a protector, is sufficient lubricating properties are not obtained at the time of make-up of a threaded joint for pipes, and it becomes easy for galling to occur. It becomes particularly easy for galling to occur when a solid lubricating coating is formed on only one of a pin and a box.

A solid lubricating coating also performs an anticorrosive or corrosion-protecting function, so part of a thread which has lost a solid lubricating coating easily undergo rusting. Even when a threaded joint is in a made-up state, it is not completely sealed against the outside air, and there is a gap between the stabbing flanks of the male thread and the female thread of threadably engaged threaded portions of the pin and the box. As a result, there is no protection against rust if the lubricating coating peels off such that the base metal is exposed. If rust develops in the threaded portions of a threaded joint in a made-up state, when oil country tubular goods are raised for the purpose of inspection or the like, rust may impede break-out (loosening) of the threaded joint and cause galling when the joint is then remade-up.

Also when a coating applied to a threaded joint is a solid corrosion protective coating, rusting easily occurs if the solid corrosion protective coating peels off the threaded portion due to interference with a protector.

In addition, a location where a solid lubricating coating or solid corrosion protective coating has peeled off and the base metal is exposed can be easily distinguished with the naked eye from a portion where a sound coating remains. Consequently, peeling of the coating is prominent when the protector is removed, and this makes the user uneasy about quality.

The object of the present invention is to provide a protector for protecting a pin or a box of a threaded joint in which at least one of the pin and the box of the joint has been treated for lubrication by forming a solid lubricating coating and the joint is made-up without on-site application of a lubricant and particularly of a viscous liquid lubricant such as compound grease, wherein damage to the solid lubricating coating of the threaded joint caused by mounting of the protector is minimized without substantially decreasing the galling resistance and corrosion resistance of the threaded joint.

The present inventors noticed that the thickness of a solid lubricating coating which covers a threaded portion of a threaded joint for pipes is not uniform in a cross section of the thread in the longitudinal axial direction of the joint. A solid lubricating coating is typically formed by applying a liquid coating composition to the surface of a threaded joint and then solidifying or setting the coating by drying, heating, cooling, irradiation with ultraviolet light, or the like. Therefore, as schematically shown in FIG. 2, the solid lubricating coating formed on the threaded portion varies in thickness in the axial direction, i.e., it is thick at the center of a thread crest and becomes thinner towards both ends of the crest, and the coating thickness becomes extremely thin at the corners of the thread crest. The cause of this coating thickness distribution is thought to be that it is difficult for a liquid coating composition to adhere to the corners, and shrinkage of the coating often occurs at the time of setting of the coating. A chamfer is sometimes provided at the corners of a thread crest, but even when there is a chamfer, the coating thickness of a solid lubricating coating becomes smallest at the corners on both sides of a thread crest. At a thread root where liquid accumulates, the coating thickness is largest at the corners, but there is a smaller variation in the coating thickness in the axial direction as compared to that observed on a crest.

The reasons why a solid lubricating coating easily peels from a threaded portion of a threaded joint for pipes and particularly on a thread crest at the time of mounting of a protector are conjectured to be that the solid lubricating coating is extremely thin at the corners of a thread crest, and due to contact with the threaded portion of a protector, the solid lubricating coating first peels off at the corner of a thread crest, and then when interference with the thread of the protector occurs, the solid lubricating coating peels off the entirety of the thread crest.

It was found that if the thread shape of the thread of a protector is made so as to avoid contact with the thread crest of the threaded portion of a threaded joint for pipes and so as to primarily contact the thread root of the threaded portion of a threaded joint for pipes, peeling of a solid lubricating coating on the threaded portion of a threaded joint for pipes caused by mounting of a protector is prevented, and the galling resistance of a threaded joint for pipes after removal of a protector is markedly improved.

The present invention relates to a protector for a threaded joint for pipes for protecting a pin or a box of a threaded joint for pipes having a pin-box structure in which the surface of at least a threaded portion is covered with a solid lubricating coating. This protector comprises a tubular member having a threaded portion on its inner or outer peripheral surface which threadably engages with at least a portion of the complete thread of a threaded portion provided on the pin or the box.

The tubular member which constitutes the protector may be of the type in which the end surface on the proximal side which is exposed to the exterior when the protector is mounted on a box or a pin (the rear side in the direction of tightening) is closed off, or it may be a type in which this side is open. A closed protector may be of the type in which the closure is constituted by a lid which can be removed so that even if the protector is not removed, observation of the interior of a tubular member in the form of a pin or a box or a drift test is possible by removing the lid.

The protector preferably has a sealing portion which forms a seal at the tip (front end) of the protector and at the tip of the pin or the box when the protector is mounted by thread engagement on a pin or a box which is to be protected by the protector.

A protector for a threaded joint for pipes according to the present invention is characterized in that the thread height H1 of the threaded portion of the protector and the thread height H2 of the complete thread of the pin or the box which is to be protected satisfy H1>H2, and the difference between H1 and H2 [=H1−H2] is larger than the maximum coating thickness on the thread crest of the solid lubricating coating which covers the threaded portion of the pin or the box which the protector is to protect.

As shown by t in FIG. 2, the maximum coating thickness on a thread crest of a solid lubricating coating is normally the thickness of the solid lubricating coating at the center in the axial direction of the thread crest. When the threaded portions of a threaded joint (a pin or a box) and a protector are tapered threads and the thread height of each thread varies in the axial direction of the joint, H1 and H2 are the thread height at the center in the axial direction of thread.

Features of preferred embodiments of a protector for a threaded joint for pipes according to the present invention include:
  the threaded portion of the protector has 3-5 threads in its axial section;
  the threaded portion of the protector is positioned on the surface of the protector opposing the complete thread of a pin or a box in the location closest to the rear end of the protector;
  the difference between H1 and H2 is in the range of 10-1,000 μm;
  the thread width of the threaded portion of the protector is 0.5-0.75 times the thread width of the complete thread of the threaded portion of the pin or the box which is to be protected;
  the load flank of the thread of the threaded portion of the protector is substantially vertical (the load frank angle being in the range from −2° to +2°);
  the load flank angle α of the complete thread of the threaded portion of the pin or the box is negative, and the load flank angle β of the thread of the threaded portion of the protector is substantially the same as or smaller than α.

Here, the "rear end" of the protector means the end of the protector on the backward side in the direction of tightening of the protector. Conversely, the "front end" means the end of the protector on the forward side in the direction of tightening of the protector.

A protector for a threaded joint for pipes according to the present invention is preferably a protector for protecting a threaded joint for pipes having torque shoulders which contact each other when the pin and the box are connected. These torque shoulders of the pin and the box preferably have sloping surfaces which slope by the same angle as each other with respect to the direction perpendicular to the pipe axis, with the torque shoulder at the end of the pin sloping backwards from the outer side of the pipe towards the center thereof.

When a protector is for protecting a box having the above-described torque shoulder, the end surface at the forward end of the protector is preferably a sloping surface having an angle of slope which is the same as that of the torque shoulder of the pin. This sloping surface of the protector can intimately contact the sloping surface of the torque shoulder of the box, thereby forming a first sealing portion at the base of the box.

When a protector is for protecting a pin having the above-described torque shoulder, the protector preferably has a sloping surface on the inner surface at the rear end of the protector which has the same angle of slope as the torque shoulder at the tip of the pin and which can abut against the end of the pin. This sloping surface can intimately contact the sloping surface of the torque shoulder of the pin, thereby forming a first sealing portion.

A protector for a threaded joint for pipes according to the present invention preferably has a second sealing portion located at the opposite end in the axial direction of the threaded joint from the first sealing portion.

Specifically, in the case of a protector for protecting a box, the protector preferably has a second sealing portion on the outer surface in the vicinity of the rear end of the protector which abuts against the tip of the box and forms a seal when the protector is mounted on a box. This second sealing portion may be constituted by an elastic sealing ring which is mounted on the outer surface of the protector.

In the case of a protector for protecting a pin, the protector preferably has an elastic sealing ring on the front open end of the protector which intimately contacts the outer peripheral surface of the pin when the protector is threadably engaged with the threads of a pin and constitutes a second sealing portion.

A protector for a threaded joints for pipes according to the present invention is suitable for protecting the pin or the box of a threaded joint for pipes in which the threaded portions has a solid lubricating coating formed by applying a liquid coating composition and then solidifying the coating by drying, heating, cooling, or UV irradiation.

A threaded joint for pipes which is protected by a protector according to the present invention may have a solid lubricating coating on the threaded portions of both the pin and the box. In this case, a protector for both the pin and the box is preferably a protector according to the present invention.

A protector according to the present invention can also be used with a threaded joint for pipes in which the threaded portion of only one of a pin and a box has a solid lubricating coating. Even when a solid lubricating coating is formed on only one of a pin and a box, if the solid lubricating coating is sound, make-up can be performed without applying a grease-type lubricant. A lubricant is needed to be present in the gaps in the threaded portions of a pin and a box, and it is sufficient to supply the lubricant from just one of a pin and box. In this case, the threaded portion of the other member which does not have a solid lubricating coating and preferably its entire surface including its unthreaded metal contact portion and its torque shoulder preferably has a corrosion protective coating to prevent rusting. In this case, a solid lubricating coating is preferably applied to the threaded portion of the box, and a solid corrosion protective coating is applied to the threaded portion of the pin.

When a solid lubricating coating is applied to the threaded portion of only one of a pin and a box and preferably a box, the solid lubricating coating is preferably a coating containing a lubricating powder in a binder having plastic or viscous tribological properties. Such a solid lubricating coating is preferably a hot melt coating which is formed by spray coating of a composition having a binder in a molten state. In this case, the solid corrosion protective coating which covers the threaded portion of the pin is preferably a coating having an ultraviolet light curable resin as a binder.

According to the present invention, for a threaded joint which undergoes lubricating treatment with a solid lubricating coating on at least one of the pin and the box of the joint so as to enable make-up of the joint without on-site application of a viscous liquid lubricant such as a compound grease, damage to the solid lubricating coating on a threaded portion of the joint due to mounting of a protector for protecting the pin or the box of the joint is minimized without substantially decreasing the galling resistance or corrosion resistance of the threaded joint.

In addition, by suitably providing the protector with a first and a second sealing portion, the contact surfaces of a threaded joint including the threaded portions can be isolated from the exterior by mounting of the protector on the joint, and the penetration of foreign matter or rain water to the contact surfaces of the threaded joint is prevented, as a result of which it becomes difficult for rusting to take place.

When the pin and the box have torque shoulders which intimately contact each other at the time of make-up, by giving the end surface of the protector a shape matching the torque shoulder of the member on which the protector is mounted, even when the threaded portion of the protector which threadably engages with the threads of the pin or the box has minimized number of threads, the protector can be easily mounted on the pin or the box by aligning the protector with the axis of the pin or box.

A: steel pipe; B: coupling; 1: pin; 2: box; 3a: male threaded portion; 3b: female threaded portion; 11: box; 12: threaded portion; 13: unthreaded metal contact portion; 14: torque shoulder; 15: solid lubricating coating; 21: protector for a box; 22: threaded portion; 26: first sealing portion; 27: second sealing portion; 28: sealing ring; 31: pin; 32: threaded portion; 33: unthreaded metal contact portion; 34: torque shoulder; 35: solid lubricating coating; 41: protector for a pin; 42: threaded portion; 46: first sealing portion; 47: second sealing portion; 48: sealing ring; 49: annular groove

PREFERRED EMBODIMENTS OF THE INVENTION

Below, the present invention will be explained based on preferred modes while referring to the attached drawings.

Figure 1:
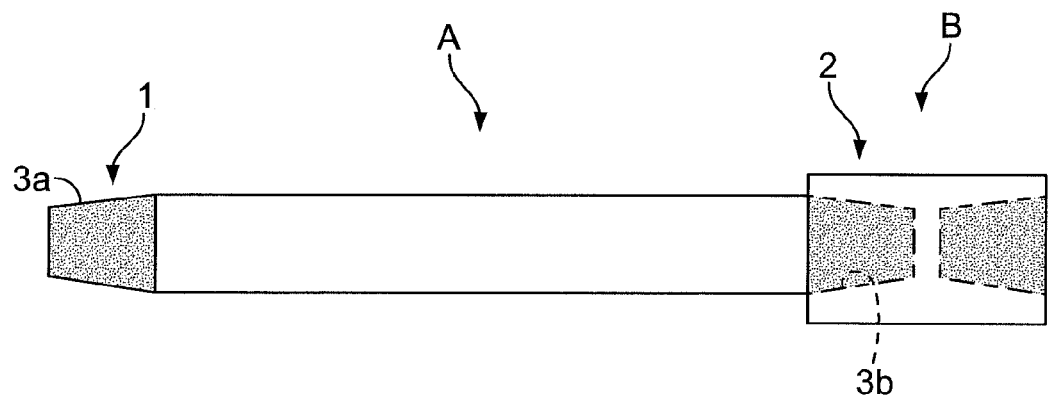
FIG. 1 schematically shows the assembled structure of a steel pipe and a threaded joint component at the time of shipment of the steel pipe.
Figure 2:
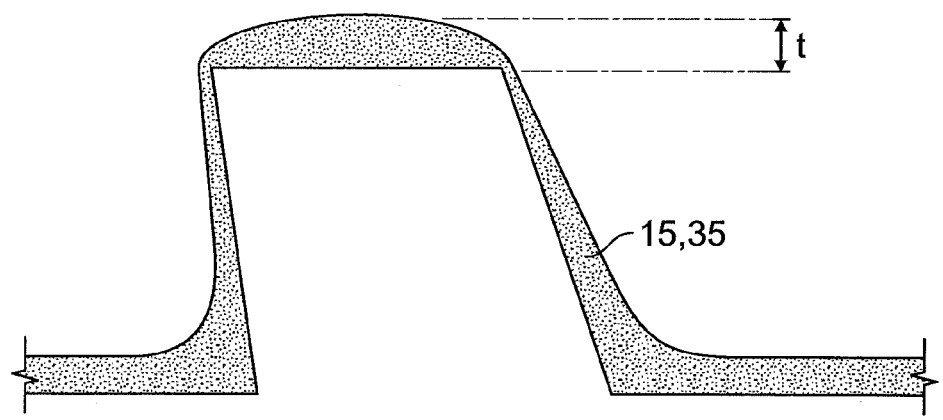
FIG. 2 is an explanatory view schematically showing a cross section in the joint axial direction of a solid lubricating coating formed on the thread of a pin or a box.

A protector for a threaded joint for pipes according to the present invention can be applied to either a coupling-type threaded joint for pipes like that shown in FIG. 1 or an integral threaded joint for pipes having a pin on one end of a steel pipe and a box on the other end thereof. In a typical coupling-type threaded joint, the outer peripheral surface of the end portion of a steel pipe is a pin and the inner peripheral surface of a coupling is a box, but the opposite arrangement is also possible.

In the following explanation, the present invention will be explained with respect to a protector which is mounted on a premium threaded joint which has a tapered threaded portion as well as an unthreaded metal contact portion and which has excellent fluid tightness, but the threaded portion of a threaded joint for pipes need not be tapered, and a protector according to the present invention can also be applied to a threaded joint for pipes which does not have an unthreaded metal contact portion. In addition, there is no particular restriction on the thread shape of a threaded joint for pipes. It may be a buttress thread (trapezoidal thread) according to API standards or it may be a so-called hook thread in which the load flank angle of the thread (the angle of the load flank) has a negative value.

In the following explanation, an explanation will be given of an example in which a protector is of the type in which the rear end is closed off, but as stated above, a tubular member constituting a protector may be open at both ends. In addition, a protector of the type which is closed at its rear end may be closed off by a removable lid.

Figure 3A:
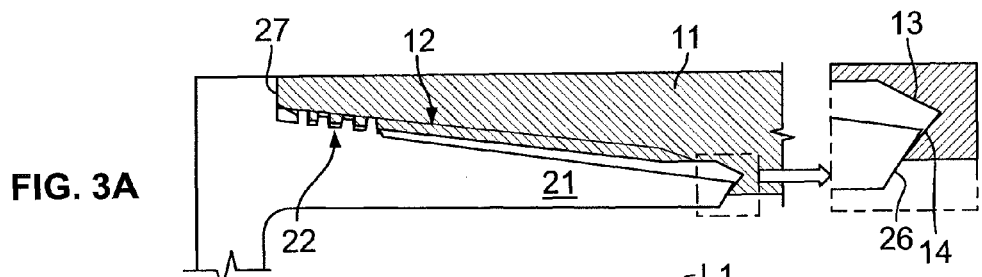
FIG. 3(A) is an axial (longitudinal) cross-sectional view schematically showing a box having a protector according to the present invention mounted thereon.
Figure 3B:
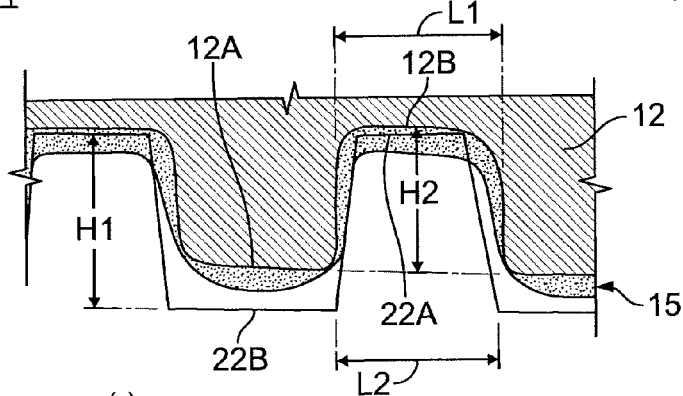
FIG. 3(B) is an axial cross-sectional view schematically showing a portion of the complete thread of a box threadably engaged with the threaded portion of a protector.

FIG. 3(A) is an axial cross-sectional view schematically showing a box of a threaded joint for pipes having a protector for a box according to the present invention mounted thereon, and FIG. 3(B) is an axial cross-sectional view schematically showing part of the threaded portion of the box which threadably engages with the threaded portion of the protector. In the figures, 11 is a box and 21 is a protector for a box.

The box 11 has a threaded portion 12 with a female thread near its tip, an unthreaded metal contact portion 13 to the rear thereof, and a torque shoulder 14 on the rearmost portion. These portions of the box constitute the contact surfaces which contact the corresponding portions of a pin when a threaded joint is made up. The female thread formed on the threaded portion 12 may be in the shape of a complete thread in its entirety, or a portion of the thread in the vicinity of one or both of the ends of the threaded portion 12 may have the shape of an incomplete thread.

In the illustrated example, the torque shoulder 14 of the box 11 is provided at a location on the inner surface of the box against which a torque shoulder provided at the end of a pin abuts. A torque shoulder may be provided on the end surface of a box, or it may be provided on both the end of a pin and the end of a box. In the illustrated example, the torque shoulder 14 of the box 11 is not perpendicular to the axial direction of the joint but is constituted by a sloping surface projecting backwardly or closer to the tip of the box when going towards the center of the joint. With such a torque shoulder 14, the protector 21 for a box can be fixed in place as well as given good sealing properties by adjusting the shape of the shoulder 26 on the end of the protector.

Although not shown in FIG. 3(A), at least the threaded portion of the box and preferably the entire contact surface thereof is covered with a solid lubricating coating (15 in FIG. 3(B)). With the most typical threaded joint for pipes in which a box is formed on the inner peripheral surface of a coupling, the entire inner peripheral surface and the end surface of the coupling are normally covered with a solid lubricating coating. As stated earlier and as schematically shown in FIG. 3(B), the coating thickness of the solid lubricating coating 15 on the threaded portion 12 of the box is smaller at the crest than at the root of the thread, and the coating thickness is extremely small at the corners at both sides of the crest.

In the illustrated example, a protector 21 for a box which is designed to be mounted by thread engagement on the interior of a box 11 comprises a tubular member which is closed at one end and open at the other end, and on its outer peripheral surface it has a threaded portion 22 with a male thread which threadably engages with the female thread of the threaded portion of the box. A protector for a box is typically a tubular member made of a resin, which is fabricated by injection molding to give the shape of a protector including the threaded portion on its outer peripheral surface. A tubular metal member which is open at both ends is often fit on the interior of this tubular resin member.

The outer peripheral surface of the protector 21 is preferably designed with a shape so as not to contact the box surface (the inner surface of the coupling) except at the threaded portion 22 and at the below-described sealing surface(s). In particular, the gap between the opposing portions of the unthreaded metal contact portion 13 of the box and the protector is preferably given a large size so as to prevent contact with the unthreaded metal contact portion 13 with certainty.

The number of threads in an axial section of the threaded portion 22 of the protector may be the same as the number of complete threads in an axial section or the threaded portion 12 of the box so as to threadably engage with the complete thread of the box over its full length. In this case, the threaded portion 22 of the protector extends over the entire protector surface which opposes the complete thread of the threaded portion 12 of the box.

However, the role of the threaded portion of the protector is to secure the protector on the threaded joint (the box in this embodiment) in a prescribed position and to prevent the protector from dropping out of the threaded joint when the joint receives an impact during transport or handling of a steel pipe for oil country tubular goods. Therefore, it is not necessary for the protector to be secured with a high tightening force by thread engagement such as is required with the threaded portion of a threaded joint for pipes which is always subjected to an extremely high inner and outer pressure. For this reason, in a preferred embodiment, the number of threads in an axial direction of the threaded portion of the protector is made the minimum number which is sufficient to secure the protector and prevent it from dropping off. This number is 3-5, preferably 3-4, and most preferably 3 threads. When it is just 2 threads, fastening of the protector by thread engagement becomes loose.

In this respect, as shown in FIG. 3(A), the threaded portion of a protector is preferably positioned on the surface of the protector which opposes the complete thread of the box at the location closest to the closed end (the rear end), namely, in the rearmost portion on that surface in the direction of insertion of the protector. As a result, a portion of the complete thread of the box which interferes with the thread of the protector is limited to just the thread located in the portion closest to the open tip of the box, and damage to the solid lubricating coating of the threaded portion of the box caused by interference with the thread of the protector can be minimized.

In the present invention, the thread height H1 of the threaded portion of the protector and the thread height H2 of the complete thread of the box which is to be protected satisfy the condition H1>H2, and the difference between H1 and H2 [=H1−H2] is larger than the maximum coating thickness t at the thread crest of the solid lubricating coating 15 which covers the threaded portion of the box. The difference between H1 and H2 is preferably in the range of 10-1,000 μm. More preferably this difference is approximately 1.5-3 times the value of t.

As shown in FIG. 3(B), by having H1 and H2 satisfy the above-described conditions, when the protector 21 is mounted on a box 11 and the two threaded portions 12 and 22 are made to interfere, the thread crest 22A of the protector interfere with the root 12B of the thread of the box, but a gap remains between the solid lubricating coating 15 which covers the crest 12A of the thread of the box and the root 22B of the thread of the protector, and damage to the solid lubricating coating 15 at the thread crest of the box due to contact with the thread of the protector is avoided.

If H1=H2 or H1<H2, the crest of the thread of the box interferes with the root of the thread of the protector. The interference is accompanied by relative movement of the thread in the axial direction of the joint. Therefore, peeling of the solid lubricating coating begins from the corners of the crest of the thread, where the coating thickness is particularly small, and eventually, the entire solid lubricating coating on the thread crest may peel off.

In a protector according to the present invention, because the thread crest of the threaded portion 22 of the protector 21 interferes with the thread root of the threaded portion 12 of the box 11, damage to the solid lubricating coating at the root of the box cannot be avoided. However, as stated earlier, the coating thickness of the solid lubricating coating in the thread root is greater than the coating thickness at the thread crest, and it is particularly large at the corners of the root. Therefore, even if the thread root of the box interferes with the thread of the protector, it is difficult for the coating at the thread root to completely peel off, and the coating partially remains. A solid lubricating coating which is pushed out of the way by interference sometimes moves to the flanks of the thread of the box. Therefore, even if a grease-type lubricant is not applied at the time of connection of the box to a pin, sufficient lubrication action is imparted to the thread root of the box by the solid lubricating coating remaining in the thread root and the solid lubricating coating which moves around from the flanks of the thread. A sound solid lubricating coating is of course present at the crest of the thread of the box. Therefore, even if special lubricating treatment (such as coating with a solid lubricating coating) is not performed on a pin, galling at the time of make-up of a threaded joint for pipes can be prevented by just the solid lubricating coating on the box after removal of the protector.

In order to minimize damage to the solid lubricating coating on the flanks of the threaded portion L2 of the box 11 due to the protector, the thread width L2 of the threaded portion 22 of the protector 21 is preferably 0.5-0.75 times the thread root width L1 of the complete thread of the threaded portion 12 of the box 11 to be protected. As a result, as shown in FIG. 3(B), even if the thread of the box receive a compressive or tensile force due to the protector, the solid lubricating coating on one of the two flanks of the thread does not contact the thread of the protector and is not readily damaged. If L2 is too small, the fastening force exerted by the thread becomes inadequate.

Figure 4A:
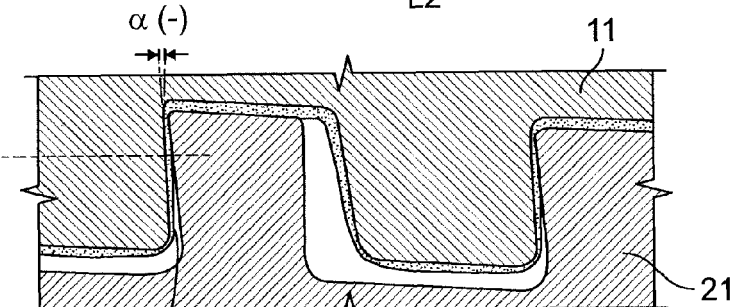
FIGS. 4(A)-4(C) are axial cross-sectional views schematically showing a portion of the threaded portion of a box threadably engaged with the threaded portion of a protector for a box.
Figure 4B:
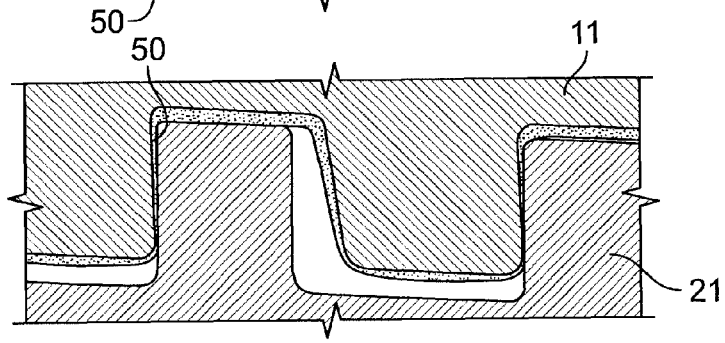
Figure 4C:
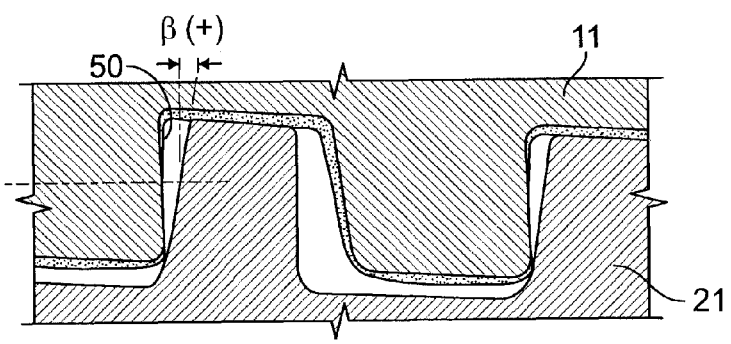

FIGS. 4(A)-4(C) are axial cross-sectional views schematically showing a portion of the complete thread of the threaded portion of a box which is threadably engaged with the threaded portion of a protector for a box. In the figures, 11 is a box, and 21 is a protector for the box. In FIGS. 4(A)-4(C), the thread of the threaded portion of the box 11 has a hook thread shape in which the load flank angle of the load flank 50 is negative. On the other hand, the load flank angle of the thread of the threaded portion of the protector 21 is negative in FIG. 4(A), it is vertical (0°) in FIG. 4(B), and it is positive in FIG. 4(C), i.e., the angles are different from each other. The stabbing flank angle of the thread of the threaded portion of the protector is vertical (0°) in all cases.

The load flank angle α of the thread of the threaded portion of the box is often nearly vertical, i.e., in the range from −3° to +3°. In this case, the load flank angle of the thread of the threaded portion of the protector is preferably substantially vertical (−2° to +2°). As a result, stable contact between the load flanks of the threaded portion of the box and the threaded portion of the protector after mounting the protector on a box can be achieved. Accordingly, even when the number of threads in an axial section of the threaded portion of the protector is a small value such as 3-5 threads, the protector can be stably mounted on a box.

On the other hand, when the thread of the threaded portion of the box has a hook thread shape in which the load flank angle α is negative, the load flank angle β of the thread of the threaded portion of the protector is preferably substantially equal to α (within the range of a α±2°) or is smaller than α. For example, when a for the threaded portion of the box is −3°, the load flank angle β of the thread of the protector is substantially equal to a if the value of β is in the range of −1° to −5°. As a result, as described above, the protector can be stably mounted on the box.

When the load flank angle β of the protector is smaller than α (for example, when α is −3° and β is smaller than −5° such as −8°), contact between the load flanks of the box thread and protector thread is concentrated at the corners of the thread root of the threaded portion of the box or it can be made to occur only at the corners of the thread root. This results in the region of contact of the thread of the protector with the threaded portion of the box being more limited, and the solid lubricating coating on the crest of the threaded portion of the box can be protected with certainty.

As detailed later, it is preferred that a protector for a box have a first sealing portion 26 and a second sealing portion 27 which are in the vicinity of its closed end (the rear end) and its open end (the front end), respectively, and which can intimately contact the surfaces of a box when the box protector is mounted by thread engagement on a box to be protected.

Figure 5A:
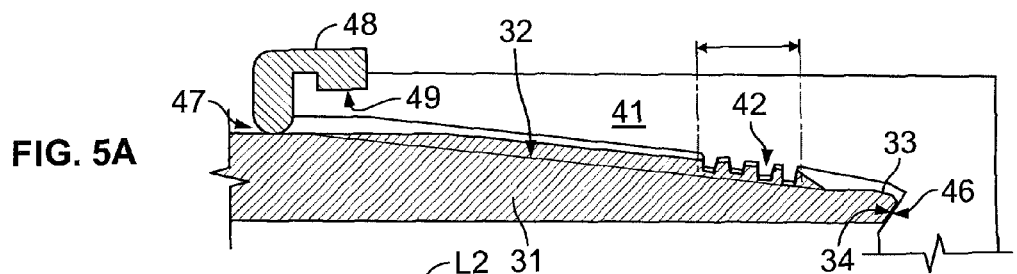
FIG. 5(A) is an axial cross-sectional view schematically showing a pin having a protector according to the present invention mounted thereon.
Figure 5B:
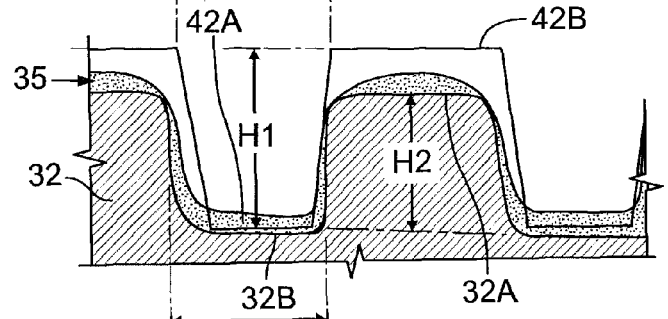
FIG. 5(B) is an axial cross-sectional view schematically showing a portion of the complete thread of the pin threadably engaged with the threaded portion of the protector.

FIG. 5(A) is an axial cross-sectional view schematically showing a pin of a threaded joint for pipes having a protector for a pin according to the present invention mounted thereon, and FIG. 5(B) is an axial cross-sectional view schematically showing a portion of the threaded portion of a pin which is threadably engaged with the threaded portion of the protector. In the figures, 31 is a pin, and 41 is a protector for a pin.

The pin 31 has a threaded portion 32 with a male thread at the base of the pin 31, a torque shoulder 34 on its end surface, and an unthreaded metal contact portion 33 between the threaded portion and the torque shoulder. These portions of the pin constitute contact surfaces which contact the corresponding portions of a box when the threaded joint is made up. The male thread formed on the threaded portion 32 may be in the shape of a complete thread in its entirety, or the thread in the vicinity of one or both of the ends of the threaded portion 32 may have the shape of an incomplete thread.

A torque shoulder 34 which is constituted by at least a portion of the end surface at the tip of the pin is a sloping surface which is backwardly sloped with respect to the direction perpendicular to the pipe axis from the outer side of the pipe towards its center. Therefore, as stated earlier, the torque shoulder 14 of a box 11 is constituted by a sloping surface with the same angle of slope so as to contact the torque shoulder 34 of the pin 31. These torque shoulders need not be planar and can be curved surfaces in which one is concave and the other is convex.

Although not shown in FIG. 5(A), at least the threaded portion of the pin and preferably the entirety of its contact surfaces is covered with a solid lubricating coating (35 in FIG. 5(B)). In the case of the most typical threaded joint for pipes in which a pin is formed on the outer peripheral surface of the end of a steel pipe, the entire outer peripheral surface and the end surface of the end of a steel pipe are normally covered with a solid lubricating coating. As stated earlier and as schematically shown in FIG. 5(B), the coating thickness of the solid lubricating coating 35 on the threaded portion 32 of the pin is smaller at the crest than at the root of thread, and the coating thickness is extremely small at the corners on both sides of a crest.

In the illustrated example, a protector 41 for a pin which is designed so as to be mounted by thread engagement on the outer surface of a pin 31 is a tubular member which is closed at one end and open at the other end, and its inner peripheral surface has a threaded portion 42 having a female thread which threadably engages with the male thread of the threaded portion of the pin. A protector for a pin is typically a tubular member made of a resin, which is fabricated by injection molding to give the shape of a protector including the threaded portion on its inner peripheral surface. A tubular metal member which is open at both ends is often fit on the exterior of this tubular resin member.

Except for the threaded portion 32 and a below-described sealing surface, the inner peripheral surface of the protector 41 is preferably designed with a shape so as not to contact the pin surface (the outer surface of the end portion of the steel pipe). In particular, the gap between the opposing portions of the unthreaded metal contact portion 33 of the pin and the protector is preferably given a large size so as to prevent contact with the unthreaded metal contact portion 33 of the pin with certainty.

The number of threads in an axial section of the threaded portion 42 of the protector 41 may be the same as the number of complete threads in an axial section of the threaded portion of the pin so that the protector can threadably engage with the complete thread of the pin 31 for its entire length. In this case, the threaded portion 42 of the protector extends over the entirety of the portion of the surface of the protector which opposes the complete thread of the threaded portion 32 of the pin.

However, for the same reasons as stated above with respect to a protector 21 for a box, the number of threads in an axial section of the threaded portion 42 of the protector 41 is preferably the minimum number sufficient to secure the protector and prevent it from dropping off the pin. This number is 3-5, preferably 3-4, and most preferably 3 threads. When it is just 2 threads, fastening of the protector by thread engagement becomes loose.

As shown in FIG. 5(A), the threaded portion of the protector 41 is preferably positioned in the location closest to the closed end (the rear end) on the surface of the protector opposing the complete thread of the box, namely, in the rearmost portion in the direction of insertion of the protector. As a result, a portion of the complete thread of the pin which interferes with the thread of the protector is limited to the thread in the portion closest to the tip of the pin, and damage to the solid lubricating coating in the threaded portion of the pin due to interference with the thread of the protector can be minimized.

In the present invention, the thread height H1 of the threaded portion of the protector and the thread height H2 of the complete thread of the pin which is to be protected satisfy the condition expressed by H1>H2, and the difference between H1 and H2 [=H1−H2] is larger than the maximum thickness t in the thread crest of the solid lubricating coating 35 which covers the threaded portion of the pin. Preferably, the difference between H1 and H2 is in the range of 10-1,000 μm. More preferably, this difference is around 1.5-3 times the value of t.

As shown in FIG. 5(B), by having H1 and H2 satisfy the above-described conditions, when the protector 41 is mounted on a pin 31 and both threaded portions 32 and 42 interfere with each other, the thread crest 42A of the protector interferes with the root 32B of the thread of the pin, but a gap remains between the solid lubricating coating 35 which covers the thread crest 32A of the pin and the root 42B of the thread of the protector such that the solid lubricating coating 35 is prevented from being damaged due to contact with the thread of the protector.

As stated with respect to a protector for a box, in a conventional protector, when a protector is mounted on a pin or removed, the solid lubricating coating is often completely peeled off from the thread crest of the pin due to the interference between the pin and the protector. However, in a protector according to the present invention, although the thread crest of the threaded portion 42 of a protector 41 interfere with the thread root of the threaded portion 32 of a pin 31, complete peeling of the coating in this region is avoided, and a portion of the solid lubricating coating which is pushed away by interference moves to the flanks of the thread of the pin. Therefore, even if application of a grease-type lubricant is not carried out at the time of connection of the pin with a box, sufficient lubricity is imparted to the root of the thread of the pin due to the solid lubricating coating which remains in the root of the thread and the solid lubricating coating which moves around from the flanks. Of course, a sound solid lubricating coating remains at the crest of the thread of the pin. Therefore, even if a lubricating treatment (such as coating with a solid lubricating coating) is not specifically carried out on the box, galling at the time of make-up of a threaded joint for pipes after removal of the protector can be prevented by just the solid lubricating coating on the pin.

In order to minimize damage to the solid lubricating coating on the flanks of the thread in the threaded portion 32 of the pin due to the protector, the thread width L2 of the threaded portion 42 of the protector 41 is preferably made 0.5-0.75 times the thread width L1 of the complete thread of the threaded portion 32 of the pin 31 which is to be protected. As a result, as shown in FIG. 5(B), even if the threaded portion of the pin is subjected to a compressive force or a tensile force by the protector, the solid lubricating coating on one of the two flanks of the thread does not contact the thread of the protector and is not readily damaged. If L2 is too small, the fastening force exerted by the thread becomes inadequate.

Figure 6A:
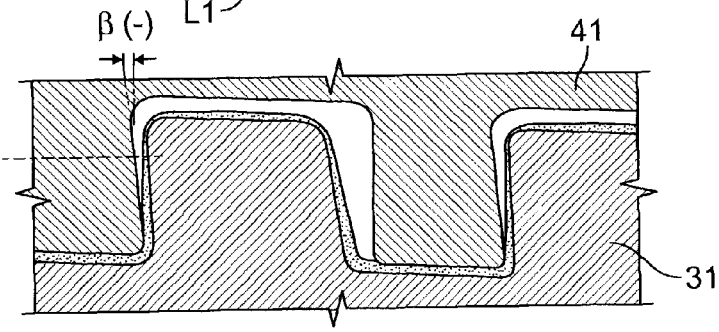
FIGS. 6(A) and 6(B) are axial cross-sectional views schematically showing a portion of the threaded portion of a pin threadably engaged with the threaded portion of a protector for a pin.
Figure 6B:
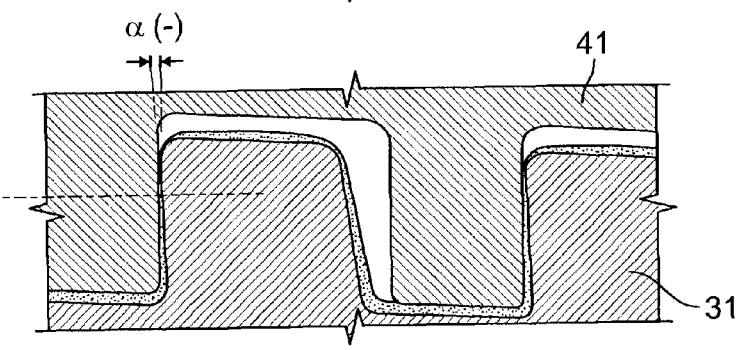

FIGS. 6(A) and 6(B) are axial cross-sectional views schematically showing a portion of a threaded portion of a pin which is threadably engaged with the threaded portion of a protector for a pin. In the figures, 31 is a pin and 41 is a protector for a pin. In FIGS. 6(A) and 6(B), the thread of the threaded portion of the pin have a hook thread shape in which the load flank angle is negative. On the other hand, the load flank angle of the thread of the threaded portion of the protector 41 is negative in FIG. 6(A), and it is vertical (0°) in FIG. 6(B). The stabbing flank angle of the thread of the protector 41 is vertical (0°).

For the same reasons as explained with respect to a protector for a box, making the load flank angle of the thread of the threaded portion of a protector substantially vertical (−2° to +2°) is preferable for stably mounting the protector.

Even when the complete thread of the threaded portion of the pin has a hook thread shape in which the load flank angle α is negative, as explained with respect to a protector for a box, the load flank angle β of the thread of the threaded portion of the protector is preferably made a negative angle substantially equal to α (α±2°) or is made a still smaller negative angle. In the former case, the protector can be stably mounted on a pin even when the protector has only 3-5 threads in its axial section. In the latter case, the region of contact of the thread of the protector with the threaded portion of the pin is more restricted, and the solid lubricating coating on the crest of the thread of the pin can be protected with certainty.

As stated below, a protector 21 for a box preferably has a first sealing portion 26 and a second sealing portion 27 in the vicinity of the closed end (the rear end) and the open end (the front end), respectively, which can intimately contact the surface of the box when the protector is mounted by thread engagement on a box 11 to be protected. Similarly, a protector 41 for a pin preferably has a first sealing portion 46 and a second sealing portion 47 in the vicinity of its open end and closed end, respectively, for intimately contacting the surfaces of the pin when mounted by thread engagement on a pin 21 to be protected. In this invention, the sealing portion of a protector which intimately contacts the torque shoulder of a pin or a box is designated as a first sealing portion, and the sealing portion which is provided on the opposite side of the protector and which intimately contacts the outer surface of a pin or the outer surface of a box is designated as a second sealing portion.

As shown in FIG. 3(A), the first sealing portion 26 of the protector 21 for a box is formed by a sealing surface which can abut against at least a portion of the torque shoulder 14 of the box. When the torque shoulders 14 and 34 of the box and the pin which contact each other are formed by sloping surfaces as described above, by constituting the end surface of the open end of the protector 21 for the box by a sloping surface having the same angle of slope as the torque shoulder 34 of the pin 31, the end surface of the protector serves as a sealing surface which intimately contacts the torque shoulder 14 of the box 11, so this is made a first sealing portion 26 of the protector 21. By constituting the sealing portion by a sloping surface in this manner, the sealing properties of the sealing portion of the protector are increased compared to the case in which the sealing surface is constituted by a surface which is perpendicular to the axial direction of the joint.

As the number of threads in an axial section of the threaded portion of the protector decreases and particularly when it becomes 3-5 threads, there is an increasing possibility of the protector easily deviating from the axis of a box when the protector is mounted on the box and being secured in a sloping state. However, by making the end surface of the open end of the protector a sloping surface having the same angle of slope as the torque shoulder of the box, as the end surface of the protector begins to abut against the shoulder of the box, the protector is forced in so as to be aligned with the longitudinal axis of the box (it undergoes self-alignment). Accordingly, the angle of slope of the end surface of the open end of the protector preferably has the same angle of slope as the torque shoulder of the box.

Similarly, as shown in FIG. 5(A), in a protector 41 for a pin, a first sealing portion 46 is preferably provided on the inner surface of the closed end of the protector. The first sealing portion 46 is constituted by a sloping surface having the same angle of slope as the torque shoulder 34 formed by a sloping surface provided on the tip of the pin, and the end surface of the pin can abut against at least a portion of the sloping surface of the protector.

Figure 7:
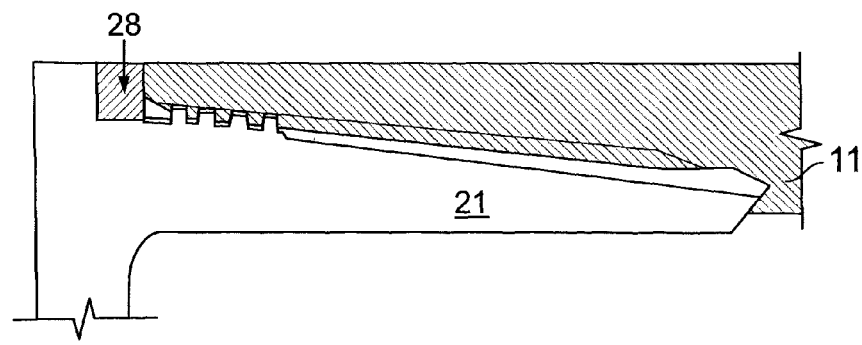

The second sealing portion 27 of a protector 21 for a box may form a seal by abutting against the end of a box 11 when the protector 21 is mounted on the box 11. As shown in FIG. 3(A), the second sealing portion 27 may be a sealing surface which is provided on the outer peripheral surface in the vicinity of the closed end of the protector body and against which the end of the box abuts. More preferably, as shown in FIG. 7, an elastic sealing ring 28 is mounted on the outer peripheral surface in the vicinity of the closed end of the protector 21, and a wall surface formed by this elastic member forms a second sealing portion 27 which contacts the end of the box. As a result, the reliability of the seal is increased. Although not shown in the drawings, an annular groove which is slightly narrower than the width of the sealing ring may be provided on the protector in order to secure the sealing ring 28 in place. A sealing surface which forms this second sealing portion is designed so as to intimately contact the end surface of the box. In the illustrated example, the end surface of the box is perpendicular to the axial direction of the joint, so the sealing surface which constitutes the second sealing portion is also perpendicular to the axial direction.

As shown in FIG. 5(A), the second sealing portion of a protector 41 for a pin preferably is formed by mounting an elastic sealing ring 48 which intimately contacts the outer peripheral surface of a pin 31 when the threads of the protector 41 are threadably engaged with the threads of the pin 31 on the open end (the front end) of the protector 41. In order to achieve this object, the sealing ring 48 preferably surrounds the open end surface of the protector 41 and projects inwardly beyond the protector body such that it can intimately contact the outer peripheral surface of the pin while leaving a gap between the vicinity of the end surface of the protector body and the outer peripheral surface of the pin. The elastic sealing ring 48 in the illustrated embodiment is secured to the protector body by fitting a portion of the sealing ring into an annular groove 49 provided in the vicinity of the open end of the outer peripheral surface of the protector body. A different securing means is also possible.

By providing a first sealing portion and a second sealing portion on the protector in the manner described above, when the protector is mounted on a pin or a box, in the case of a protector for a box, the gap between the outer peripheral surface of the protector and the inner peripheral surface of the box, and in the case of a protector for a pin, the gap between the inner peripheral surface of the protector and the outer peripheral surface of the pin is isolated from the exterior, and the penetration of foreign materials and rain water into the gap which causes injuries, rusting, and a decrease in galling resistance is prevented.

As explained above, a threaded joint for pipes which is protected by a protector according to the present invention has a solid lubricating coating on at least the threaded portion and preferably over the entire contact surface including the threaded portion, the unthreaded metal contact portion, and the torque shoulder of at least one of a pin and a box, such as a box.

A solid lubricating coating which covers the surface of the pin and/or the box typically is a coating comprising a lubricating powder (a solid lubricant) dispersed in a suitable binder. There have been many proposals in the past of a solid lubricating coating for a threaded joint for pipes, and such coatings can be utilized in the present invention. In a typical coating the binder is an organic resin having considerably good heat resistance such as an epoxy resin, a polyacrylate resin, a polyimide resin, a polyamide-imide resin, or the like, but solid lubricating coatings in which the binder is an inorganic film-forming substance such as silica sol, a hydrolyzable silane compound, a titanium alkoxide, an alkali metal silicate, a phosphate, or the like are also known.

It has also been proposed to form a solid lubricating coating having two or more layers or to combine a liquid lubricating coating or a solid corrosion protective coating with a solid lubricating coating, and such a coating structure may also be used. However, in this case, the above-described maximum coating thickness t is the total thickness of the plurality of coating layers.

A solid lubricating coating for a threaded joint for pipes which is particularly suitable for protection with a protector according to the present invention is a coating as described in above-mentioned Patent Document 3 which is a coating comprising a lubricating powder in a binder having plastic or viscous tribological properties and particularly a coating formed by spray coating (hot melt coating) of a composition in which the binder is liquefied by melting. This type of solid lubricating coating is preferably formed on the surface of a box. A box is typically formed on a short coupling, so it is easier to carry out hot melt application on a box than on the surface of a pin, which is typically formed on the end of a long steel pipe.

A preferred solid lubricating coating of the type just described is formed from 70-95 mass % of a matrix and 5-30 mass % of a lubricating powder. In view of such a low proportion of the lubricating powder, the coating as a whole exhibits the same plastic or viscous tribological properties as the matrix does.

The matrix of the solid lubricating coating (which has plastic or viscous tribological properties at room temperature) preferably has a melting point in the range of 80-320° C. By carrying out spray application of the composition in a molten state at a temperature of at least the melting point of the matrix using a usual spray gun, it is possible to form a solid lubricating coating on the contact surfaces of the box.

This matrix preferably comprises a thermoplastic polymer, a wax, and a metal soap, and more preferably it further contains a corrosion inhibitor and a water-insoluble liquid resin.

The coating thickness of the solid lubricating coating is frequently in the range of 10-100 μm and more frequently in the range of 25-60 μm.

When the solid lubricating coating is formed on only one of a pin and a box (such as the box), the surface of the other member (such as the pin) may be covered with a solid corrosion protective coating. This solid corrosion protective coating can be formed by application of a composition based on an ultraviolet (UV) curable resin (including compositions formed solely of a UV curable resin) followed by irradiation with ultraviolet light.

In the above, the present invention has been explained with respect to a preferred embodiment, but it should be understood by those skilled in the art that the present invention is not limited to the above-described embodiment and that many variations and changes are possible within the scope of the present invention.

What is claimed is:

1. A protector for protecting a plurality of threads on a threaded portion of a pin or a box of a threaded pipe joint, the threads on the pin or box having a thread height H2, a thread groove width, and being covered with a solid lubricating coating having a maximum radial thickness t on a crest of the threads, the protector comprising:
a tubular member having a radially inner or a radially outer surface including a threaded portion configured to threadably engage with at least a portion of the threaded portion of the pin or the box,
wherein the threaded portion of the tubular member comprises a plurality of threads, every thread of the tubular member having a thread height H1 that is greater than every thread height H2, and
wherein the difference between H1 and H2 is greater than the maximum radial thickness t of the solid lubricating coating.

2. The protector of claim 1, wherein the threaded portion of the tubular member has a total number of threads in the range of 3-5.

3. The protector of claim 2, wherein each of the threads of the threaded portion of the tubular member is positioned proximal an end of the protector on the radially inner or radially outer surface of the tubular member configured to radially oppose the threaded portion of the pin or box.

4. The protector of claim 1, wherein the difference between H1 and H2 is in the range of 10-1,000 μm.

5. The protector of claim 1, wherein each thread of the threaded portion of the tubular member has a thread width that is 0.5-0.75 times the thread groove width.

6. The protector of claim 1, wherein the threads of the tubular member have a load flank that is substantially vertical.

7. The protector of claim 1, wherein the threads of the tubular member have a load flank angle $\beta$ that is less than or equal to a negative load flank angle $\alpha$ of the threads of the pin or the box.

8. The protector of claim 1, further comprising a first sealing portion at an end of the tubular member and a second sealing portion configured to form a seal with an end of the pin or the box.

9. The protector of claim 8, wherein the first sealing portion comprises a sloping surface oriented at an angle of slope that is the same as a torque shoulder of the box.

10. The protector of claim 8, wherein the first sealing portion comprises a sloping surface oriented at an angle of slope that is the same as a torque shoulder at a tip of the pin.

11. The protector of claim 8, wherein the second sealing portion is configured to form a seal by abutting against a tip of the box.

12. The protector of claim 11, wherein the second sealing portion comprises an elastic sealing ring disposed about the tubular member.

13. The protector of claim 8, further comprising an elastic sealing ring on a front open end of the protector, the sealing ring defining the second sealing surface.

14. A protector for protecting a plurality of male threads on a threaded portion of a pin of a threaded pipe joint, the threads on the pin end having a thread height H2 and being coated with a solid lubricating coating having a maximum radial thickness t on a crest of the threads, and the protector comprising:
a tubular member having a radially inner surface including a female threaded portion configured to threadably engage with at least a portion of the threaded portion of the pin,
wherein the female threaded portion of the tubular member comprises a plurality of threads, every thread of the tubular member having a thread height H1 that is greater than every thread height H2, and
wherein the difference between H1 and H2 is greater than the maximum radial thickness t of the solid lubricating coating.

* * * * *